Nov. 12, 1957                J. BJORKSTEN                2,813,063
SOLAR STILL
Filed Nov. 20, 1953                                3 Sheets-Sheet 2
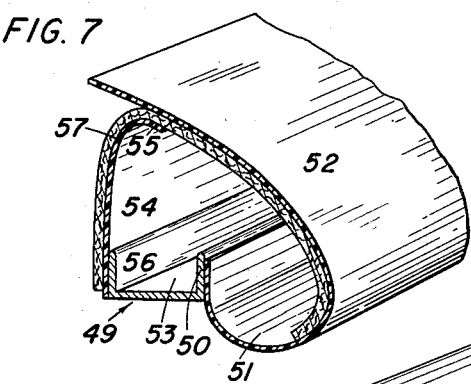
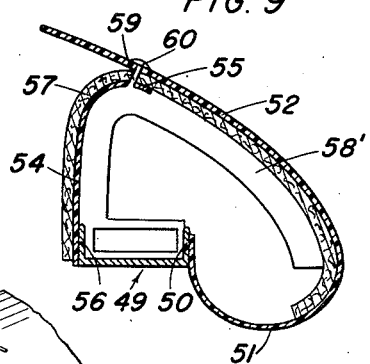
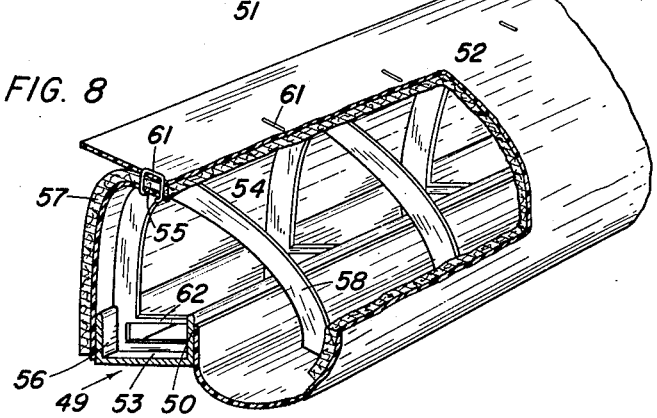
INVENTOR.
JOHAN BJORKSTEN
BY
Attorney Nov. 12, 1957    J. BJORKSTEN    2,813,063
SOLAR STILL Filed Nov. 20, 1953    3 Sheets-Sheet 3

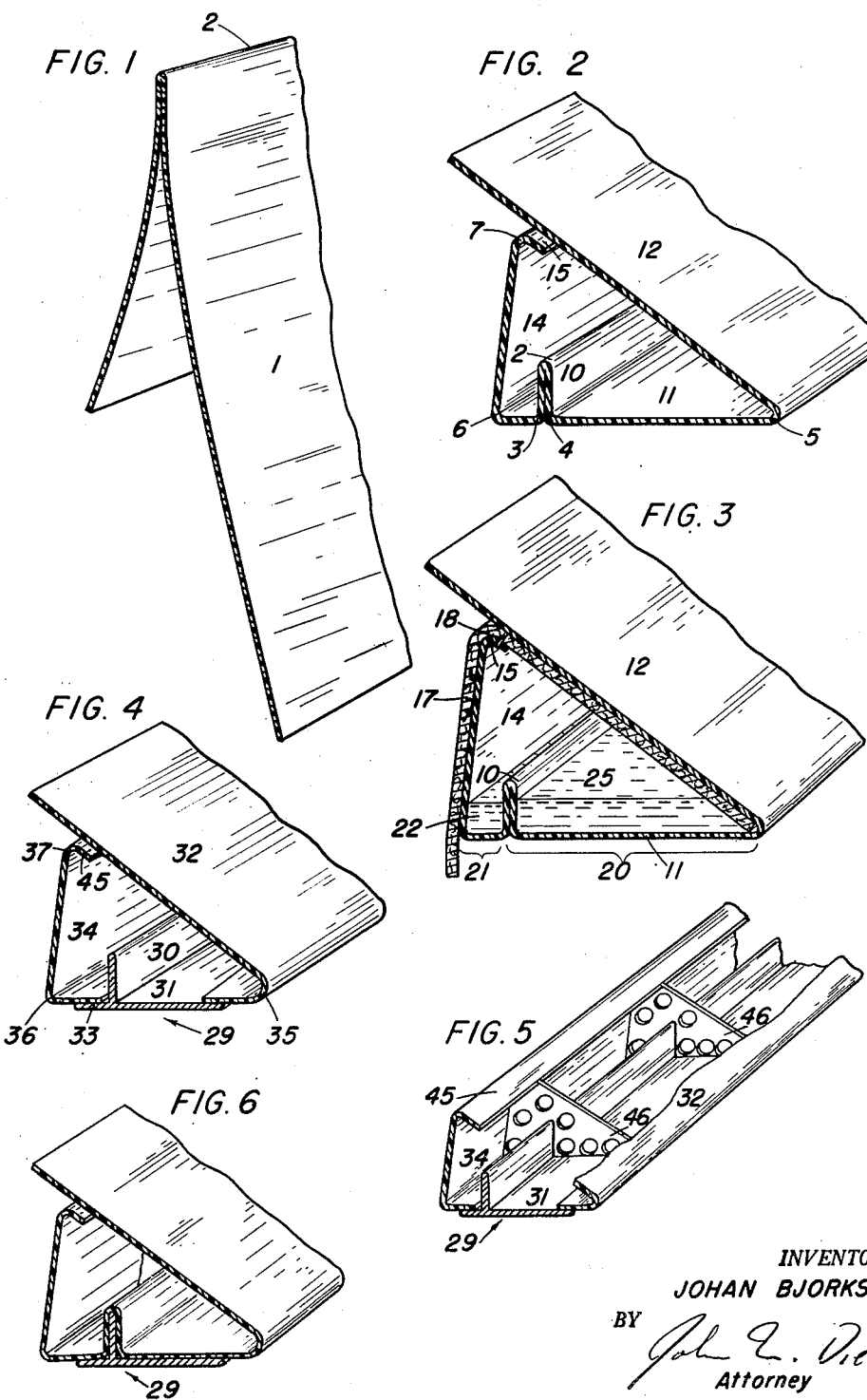

INVENTOR.
JOHAN BJORKSTEN
BY
Attorney

United States Patent Office 2,813,063
Patented Nov. 12, 1957

2,813,063
SOLAR STILL
Johan Bjorksten, Madison, Wis.

Application November 20, 1953, Serial No. 393,356

6 Claims. (Cl. 202—234)

This invention relates to means and apparatus for preparing potable water from sea water.

This application is a continuation-in-part of my copending application Serial No. 368,992, filed July 20, 1953, relating to a solar power actuated salt water still. An object of this invention is an improved means for obtaining potable water from salt water. Another object is a new means for utilizing solar power.

Further objects and the applicability of the invention will become apparent from the drawings and the following detailed description in which it is my intention to illustrate the invention without thereby limiting its scope to less than that of all equivalents which will be apparent to those skilled in the art, and in which like reference numerals refer to like parts and in which:

Figure 1 is a perspective view of a folded sheet of synthetic resin adapted to be made into a component part of the device of the invention;

Figure 2 is a perspective view of a portion of an element of a preferred embodiment made by further folding of sheet 1;

Figure 3 is a perspective view of a portion of a preferred embodiment of the invention;

Figure 4 is a perspective view of a portion of another embodiment;

Figure 5 is a perspective, partially cut-away view of a portion of a modification of the embodiment of Figure 4;

Figure 6 is a perspective view of a portion of still another modification;

Figure 7 is a perspective view of a portion of still another embodiment;

Figure 8 is a partially cut-away perspective view of a modification of the embodiment of Figure 7;

Figure 9 is a cross-section of a slightly modified form of the embodiment of Figure 8;

Figure 10:
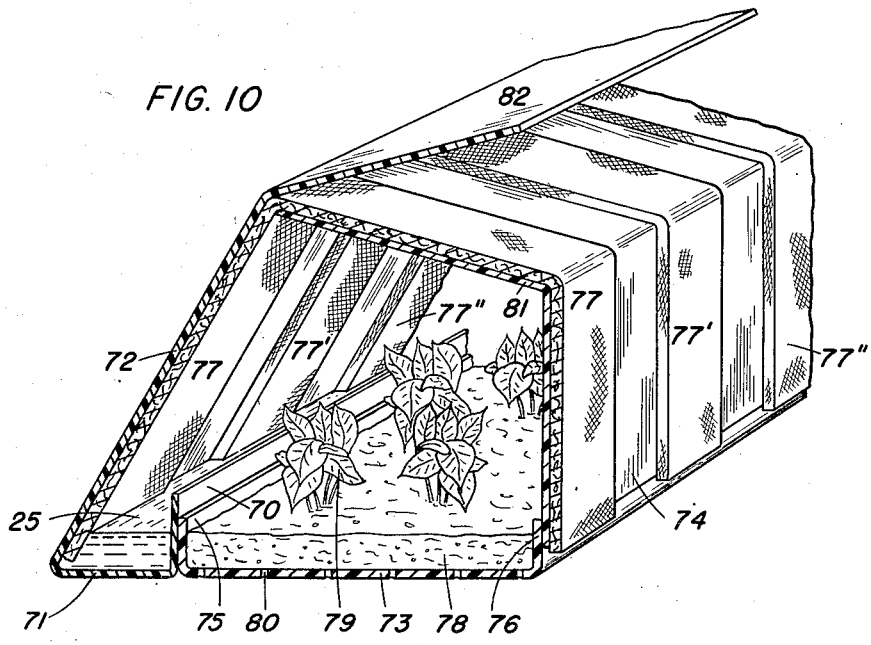
Figure 10 is a perspective view of a portion of an embodiment wherein plants may be most suitably grown on the fresh-water side of the device.

In accordance with this invention, I use as the construction material for the proposed still a flexible, yet somewhat rigid plastic sheet material, which is transparent to solar radiation to such an extent as to permit heating up of the dark colored wick in its interior, when exposed to solar radiation.

For the purposes of this invention, a sheet 1 of synthetic resin, for example polyethylene is first bent at 2, as shown in Figure 1, to form a single fold. Each of the depending portions from fold 2 is then bent outwardly at 3 and 4, as shown in Figure 2. The portion between bends 3 and 4 and fold 2 may be heat-sealed or adhesively sealed together to provide a rigid partition 10 extending upward from bends 3 and 4 and terminating at fold 2. The portions extending outwardly from bend 4 may be folded upward at an acute angle at a point 5 about five times the height of the partition away from the base of the partition to thus provide floor portion 11 and roof portion 12. The portion extending outwardly from bend 3 may be bent upward at 6 about half the height of the partition away from the base of said partition to provide a flat sloping side 14. This portion may be again bent inwardly and downwardly at 7 to provide inwardly-extending portion 15 parallel to but spaced away from roof portion 12. The device is inherently unlimited in length.

As shown in Figure 3, wick 17, preferably dark in color, may then be inserted with a portion adjacent the under side of roof portion 12 and another portion adjacent the outer surface of side 14. To hold wick 17 in place it may be stapled with staples 18 to portion 15, if desired.

Salt water 25 may then be pumped into section 20 of the device defined on the bottom by floor 11 and on the sides by partition 10 and roof 12. The wick will then imbibe the salt water, carrying it up over section 20, thence over section 21, through the space between portions 15 and 12 and thence downwardly along the outer surface of sloping side 14. Side 14 is thus cooled by evaporation from the wick while the device is positioned so that impingement of solar radiation will heat the wick 17 through roof portion 12. This will cause evaporation of the water from the wick so that it is distilled and condenses on the inside surface of sloping side 14 and collects as a body of fresh water 22 in reservoir 21 from which it can be drained through any suitable opening, not shown.

The wick may be made from a slick material, from which salt crystals which may be formed outside sloping side 14 as a result of evaporation of sea water therefrom, may fall. Alternatively the wicking and pumping may be so regulated that a concentrated salt solution in a liquid state drips off the wick on the outer side as a result of renewal of the salt liquid before salt crystals form.

While specific mention has been made of polyethylene as a suitable synthetic resin, I may use sheeting or film of any other synthetic resin such as polystyrene, polyvinylidene chloride, butadiene-styrene copolymers, polyacrylonitrile, cellulose acetate, cellulose acetate butyrate, polymethyl methacrylate and homologous polymers, copolymers of polyvinyl chloride and polyvinylidene chloride, polyethylene terephthalate, polyester, polytetrafluoroethylene and polychlorotrifluoroethylene.

In the modification of the invention illustrated in Figure 4, an extruded T-beam 29 of a relatively rigid material such as for example aluminum or magnesium serves as the principal structural member of the device. T-beam 29 comprises an upwardly extending partition portion 30, a floor portion 31 extending outwardly on one side and a floor portion 33 extending outwardly on the other side. A sheet of synthetic resin may be adhesively attached to portion 31 near its outer edge and bent upwardly at 35 to provide roof portion 32 and another sheet of synthetic resin may be adhesively attached to outwardly extending portion 33 near the edge thereof and bent upwardly at 36 to provide sloping side 34 and may be again bent at 37 to provide inwardly and downwardly extending portion 45 parallel to and spaced away from roof portion 32. A wick may be installed in this embodiment in the same manner as discussed in connection with that of Figure 3; it may be stapled to portion 45. The device may be operated in the same manner as the embodiment illustrated in Figure 3.

If a very thin and flexible film such as for example a film of polyethylene terephthalate is utilized as a synthetic resin sheet in the device, reinforcing members 46 may be provided at intervals as ribs or stiffeners, as illustrated in Figure 5. These may be perforated to provide flow of water and water vapor therethrough and may be designed to maintain the desired substantially triangular shape, illustrated in Figures 2, 3 and 4. These partitions may be spaced at intervals dependent upon the degree of rigidity of the material, but usually between about 3 inches and 3 feet apart from each other. Such partitions may be provided in the embodiments of Figures 3 and 6 as well as in the embodiment of Figure 4.

In Figure 6 there is illustrated a modification of the embodiment of Figure 4 wherein a sheet of synthetic resin folded substantially in the manner illustrated in Figure 2 is adhered to a relatively rigid T-beam 29 thus making it possible to utilize extremely lightweight plastic sheeting.

As shown in Figure 7, an extruded channel beam, indicated generally as 49, which may be of a relatively rigid material such as, for example, aluminum or magnesium, may serve as the principal structural member of the device. Channel 49 provides a space for distilled water corresponding to space 21 and consists of lower portion 53, upwardly extending web 50 which may serve as a center partition, and upwardly extending web 56. A sheet of quite thin synthetic resin may be adhered to web 50 and may extend downwardly therefrom to provide a receptacle portion 51 adapted to hold sea water and may then be bent upwardly and inwardly to provide roof portion 52. Another sheet of quite thin synthetic resin may be adhered to upwardly extending web 56 to provide sloping wall 54 and may be bent inwardly and downwardly to provide inwardly and downwardly extending portion 55 parallel to and spaced away from roof portion 52. A wick 57 may be installed in this embodiment in the same manner as discussed in connection with Figure 3.

To prevent collapse of the device when extremely thin sheets of synthetic resin are utilized, reinforcing ribs 58 or 58' may be provided at suitable intervals as shown in either Figure 8 or Figure 9. Ribs 58 may be provided with a lower end portion 62 adapted to be inserted in channel 49 and to have surfaces bearing firmly against webs 50 and 56. That portion of ribs 58 extending upwardly from said portion 62 may be adapted to support and maintain in position side 54 and roof portion 52. If desired, the structure may be further strengthened and held together by staples 61. These may be stapled through portion 52, wick 57 and portion 55.

Alternatively, as shown in Figure 9, a pronged extension 59 may be provided on each of ribs 58'. Each of extensions 59 may extend upward through previously provided holes respectively in portion 55, wick 57 and roof portion 52. If desired, that portion of extension 59 which extends upwardly beyond roof portion 52 may be upset to provide a head 60, as shown, and thus to form, in a sense, a rivet retaining wick 57 and portions 52 and 55 in place.

The wick preferably should have an absorbance of at least 75% in the infra-red region of the spectrum and may be made from any sort of fibers such as cotton, wool, felted wool, glass, nylon, polyacrylonitrile, polyester. In some cases smooth synthetic fibers may be preferable. The plastic used is preferably transparent or at least translucent. The construction of the device is characteristically such that it may be made in lengths so long as to be described as substantially unlimited. For example, in some cases it may be desirable to make the still in ten-foot sections but in many cases it may be desirable to provide sections as long as 100 feet or more either by assembly of components which are each 100 or more feet long or by attaching together shorter lengths. The construction is such as to permit a still as long as 1000 feet, or even 5280 feet (1 mile) with or without interruption by any joint or attachment. The device is, of course, best utilized in desert areas where large flat surfaces permit the use of long uninterrupted lengths.

Referring now to Figure 10 there is shown another embodiment wherein the device may be operated as a greenhouse and plants may be grown on the fresh water side. Sea water is contained in a channel formed by floor portion 71 and side portions 70 and 72. Fresh water is received in a channel comprising floor portion 73 and upwardly extending side portions 75 and 76. This channel may be adjacent to the aforesaid first channel and may be secured thereto by adhesive or heat-seal bonding between side 75 and side 70 to provide an upwardly extending partition in the interior of the device. Humus, sand or other material suitable for maintaining the roots of growing plants may be contained in this channel, supported by floor portion 73. Floor 73 may be provided with holes 80 to permit outflow of fresh water therethrough to prevent drowning or overwatering of plants 79 growing in the material 78. Wall portion 74 may be adhesively or otherwise attached to side or web 76. Wicks such as 77, 77' and 77" may underlie the inclined side portion 72 and thence overlie wall portion 74 and its roof-like extension 81.

In use salt water 83 may be contained in the first channel portion. This may travel upwards by capillary action through the wicks. Preferably the device is oriented so that the wall 72 is directed toward the sunlight and sun shining through transparent synthetic resin wall 72 evaporates moisture from the wicks which condenses on the interior of surfaces 81 and 74 and thence drips or runs down to material 78, thus watering the plants. Portions 81 and 74 may be maintained at a temperature low enough to condense the evaporated vapor as a result of evaporation from wicks 77, 77' and 77" extending over the outer surface thereof. The sloping wall 72 may be extended as shown at 82 to provide further shade for that portion of the wicks overlying roof portion 81.

In an embodiment in which plants are grown on the fresh water side it is preferable that means be provided to allow sunlight to shine on the plants and therefore it is desirable to provide a plurality of individual wicks with spaces thereinbetween to allow light to shine through the transparent portion 72 onto the plants.

Figure 11:
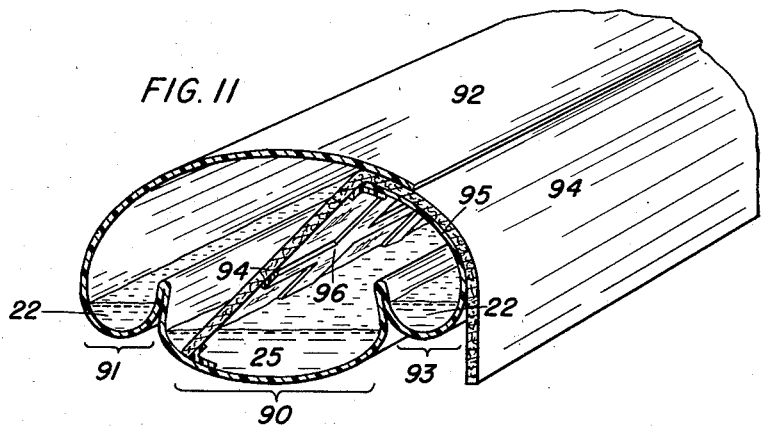
Figure 11 is a perspective view of another embodiment.

Referring now to Figure 11 there is shown another embodiment wherein salt water 25 may be contained in a central channel 90 and wherein fresh water 22 may be contained in two channels 91 and 93 adjacent the central channel 90. An outer wall of channel 91 may extend upward and over the device to provide transparent roof portion 92. The outer wall 95 of channel 93 may extend upwardly and inwardly to a point close to roof portion 92 but spaced apart therefrom. Wick 94 may extend into sea water 25 contained in channel 90 and may extend therefrom upwardly and through the space between roof portion 92 and the upwardly extending outer wall 95 of channel 93 and may overlie the outer surface of wall 95. Wick 94 may be supported in place by metal or plastic framework 96. Sunlight shining through transparent roof portion 92 onto wick 94 evaporates set water contained therein inside the device from both sides of the wick. Water vapor from one side of the wick may condense on the inner surface of the outer wall of channel 91 and water evaporated from the other side of the wick may condense on the inner surface of outer wall 95 which is cooled by further evaporation of water from wick 94 overlying the outer side of said wall. Sea water 25 may be supplied to channel 90 by any suitable means not shown and fresh water 22 may be withdrawn from channels 91 and 93 also by any suitable means not shown.

It is thus seen that the invention is broad in scope, and is not to be restricted excepting by the claims, in which it is my intention to cover all novelty inherent in this invention as broadly as possible, in view of prior art.

Having thus disclosed my invention, I claim:

1. A solar still comprising two parallel adjacent channel receptacles of substantially unlimited length separated by a partition thereinbetween, the outer wall of one of said channels being transparent and extending outwardly and upwardly substantially over the device, the outer wall of the other channel extending upwardly to a point near said first portion but spaced apart therefrom and a wick underlying said first transparent upwardly extending portion, extending through the space between said upwardly extending portions and lying against the outer surface of the second upwardly extending portion.

2. A solar still comprising two parallel channel receptacles disposed adjacent to each other, one of said receptacles being adapted to contain sea water and the other being adapted to receive fresh water condensed from water vapor produced from said sea water, a transparent wall portion extending upwardly and inwardly from the outer wall of said channel receptacle adapted to contain sea water, a wall portion extending upwardly from the outer wall of said channel receptacle adapted to contain sea water, a wall portion extending upwardly from the outer wall of said channel receptacle adapted to receive fresh water and a wick disposed against the inner surface of said inwardly transparent portion and overlying the outer surface of the portion extending upwardly from said channel receptacle adapted to receive fresh water.

3. A solar still comprising two parallel adjacent receptacle channels separated by a partition thereinbetween, one being adapted to contain sea water and the other being adapted to receive fresh water, a transparent sheet extending upwardly and inwardly over the device, a sheet of synthetic resin adapted to extend upwardly, below said first mentioned sheet, from the outer edge of said channel adapted to receive fresh water, and a wick underlying said first mentioned sheet and overlying the outer surface of said second mentioned sheet.

4. In a solar still, a strip of synthetic resin having a portion adjacent one edge adapted to provide a roof extending substantially over the device, thence bent parallel to said edge to provide a floor portion, thence bent upwardly parallel to said edge and adjacent to said floor portion to provide a partition and to thus provide a first channel-like receptacle, said partition portion bent downwardly at the top thereof to provide an opposite side of said partition, thence bent outwardly to provide another floor portion, thence bent upwardly at the edge of said floor portion to provide a wall portion and bent inwardly and downwardly at the top of said wall portion to provide an inwardly, downwardly extending portion parallel to and spaced away from said roof portion, to thus provide a second channel-like receptacle substantially parallel to the first further characterized by being provided with a wick comprising a strip of porous material having a portion adjacent one edge overlying said wall portion and extending through the space between said inwardly downwardly extending portion and said roof portion, having a portion adjacent its other edge underlying and adjacent to the under surface of said roof portion.

5. The device of claim 4 further characterized by staples extending through said wick and said inwardly and downwardly extending portion.

6. The device of claim 4 further characterized by a metal T-beam underlying said synthetic resin sheet, having the center leg of its T extending upwardly into said partition.

References Cited in the file of this patent

UNITED STATES PATENTS

| | | |
|---|---|---|
| 1,812,516 | Dooley | June 30, 1931 |
| 2,383,234 | Barnes | Aug. 21, 1945 |
| 2,398,292 | Delano | Apr. 9, 1946 |
| 2,413,101 | Delano | Dec. 24, 1946 |
| 2,445,350 | Ginnings | July 20, 1948 |
| 2,455,834 | Ushakoff | Dec. 7, 1948 |

FOREIGN PATENTS

| | | |
|---|---|---|
| 25,253 of 1935 | Australia | Aug. 13, 1936 |

OTHER REFERENCES

Apparatus for Solar Distillation, by J. Harding, Institution of Civil Engineers, Proceedings, vol. 73, February to April 1883, pages 284, 285, 286, 287 and 288.